United States Patent
Leighton et al.

(10) Patent No.: US 10,200,467 B2
(45) Date of Patent: *Feb. 5, 2019

(54) STREAM-BASED DATA DEDUPLICATION WITH PEER NODE PREDICTION

(71) Applicant: Akamai Technologies, Inc., Cambridge, MA (US)

(72) Inventors: F. Thomson Leighton, Newtonville, MA (US); Andrew F. Champagne, Ware, MA (US); Charles E. Gero, Quincy, MA (US); Guy Podjarny, Ottawa (CA)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/236,523

(22) Filed: Aug. 15, 2016

(65) Prior Publication Data

US 2016/0381130 A1 Dec. 29, 2016

Related U.S. Application Data

(63) Continuation of application No. 14/140,116, filed on Dec. 24, 2013, now Pat. No. 9,420,058.

(Continued)

(51) Int. Cl.
*G06F 15/16* (2006.01)
*H04L 29/08* (2006.01)
*H04L 29/06* (2006.01)

(52) U.S. Cl.
CPC ........ *H04L 67/108* (2013.01); *H04L 67/2847* (2013.01); *H04L 67/42* (2013.01)

(58) Field of Classification Search
CPC .... H04L 67/108; H04L 67/42; H04L 67/2847
(Continued)

(56) References Cited

U.S. PATENT DOCUMENTS

| 6,108,703 A | 8/2000 | Leighton et al. |
| 7,913,209 B1 | 3/2011 | Wu et al. |

(Continued)

FOREIGN PATENT DOCUMENTS

| CN | 102194499 A | 9/2011 |
| CN | 102378969 A | 3/2012 |

OTHER PUBLICATIONS

Pedro Diaz et al: "Stream chaining", ACM SIGARCH Computer Architecture News, ACM Special Interest Group on Computer Architecture, 2 Penn Plaza, Suite 701 New York NY 10121-0701 USA, vol. 37, No. 3, Jun. 20, 2009, pp. 81-92, XP058215190, ISSN: 0163-5964, DOI: 10.1145/1555815.1555767.*

(Continued)

*Primary Examiner* — Joseph E Avellino
*Assistant Examiner* — Marshall M McLeod
(74) *Attorney, Agent, or Firm* — David H. Judson

(57) ABSTRACT

Stream-based data deduplication is provided in a multi-tenant shared infrastructure but without requiring "paired" endpoints having synchronized data dictionaries. Data objects processed by the dedupe functionality are treated as objects that can be fetched as needed. As such, a decoding peer does not need to maintain a symmetric library for the origin. Rather, if the peer does not have the chunks in cache that it needs, it follows a conventional content delivery network procedure to retrieve them. In this way, if dictionaries between pairs of sending and receiving peers are out-of-sync, relevant sections are then re-synchronized on-demand. The approach does not require that libraries maintained at a particular pair of sender and receiving peers are the same. Rather, the technique enables a peer, in effect, to "backfill" its dictionary on-the-fly. On-the-wire compression techniques are provided to reduce the amount of data transmitted between the peers.

15 Claims, 8 Drawing Sheets

Related U.S. Application Data

(60) Provisional application No. 61/746,344, filed on Dec. 27, 2012, provisional application No. 61/746,297, filed on Dec. 27, 2012.

(58) Field of Classification Search
USPC .................................................. 709/217, 213
See application file for complete search history.

(56) References Cited

U.S. PATENT DOCUMENTS

| | | | |
|---|---|---|---|
| 8,930,648 B1 | 1/2015 | Bisson et al. | |
| 2005/0060418 A1* | 3/2005 | Sorokopud | H04L 47/22 709/230 |
| 2006/0036620 A1 | 2/2006 | Bigwood | |
| 2007/0198454 A1 | 8/2007 | Greenblatt | |
| 2007/0245090 A1 | 10/2007 | King et al. | |
| 2008/0037509 A1 | 2/2008 | Foti et al. | |
| 2010/0094817 A1 | 4/2010 | Ben-Shaul et al. | |
| 2010/0125553 A1 | 5/2010 | Huang et al. | |
| 2011/0099154 A1 | 4/2011 | Maydew et al. | |
| 2011/0099351 A1 | 4/2011 | Condict | |
| 2011/0167096 A1 | 7/2011 | Guo et al. | |
| 2011/0185149 A1 | 7/2011 | Gruhl et al. | |
| 2011/0216656 A1 | 9/2011 | Pratt, Jr. et al. | |
| 2011/0222596 A1* | 9/2011 | Huang | H03M 7/3066 375/240 |
| 2011/0246741 A1 | 10/2011 | Raymond et al. | |
| 2011/0276781 A1 | 11/2011 | Sengupta et al. | |
| 2012/0047284 A1 | 2/2012 | Tarkoma et al. | |
| 2012/0166448 A1 | 6/2012 | Li et al. | |
| 2012/0173558 A1 | 7/2012 | Sorenson et al. | |
| 2012/0233326 A1 | 9/2012 | Shaffer et al. | |
| 2013/0018851 A1 | 1/2013 | Jayaraman et al. | |
| 2013/0311433 A1 | 11/2013 | Gero et al. | |
| 2013/0318051 A1 | 11/2013 | Kumar et al. | |

OTHER PUBLICATIONS

PCT/US2013/077701, International Search Report, dated Apr. 28, 2014, 5 pages.
PCT/US2013/077701, Written Opinion, dated Apr. 28, 2014, 5 pages.
Muthitacharoen et al, "A Low-bandwidth Network File System," Proceedings 18th Symposium on Operating Systems Principles, Banff, Canada, Oct. 2001.
Chinese Application No. 201380073750.5, 1st Office Action dated Jun. 1, 2017, 13 pages.
EU Application 13866721.7, Supplementary European Search Report, dated Oct. 31, 2016, 15 pages.
Spring, Neil T., A Protocol-Independent Technique for Eliminating Redundant Network Traffic, SIGCOMM Aug. 2000, pp. 87-95.

\* cited by examiner

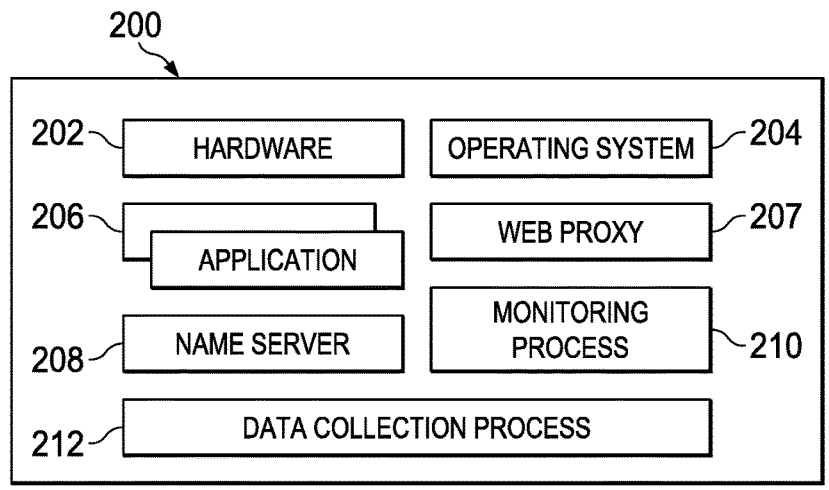
FIG. 2
| Fingerprint | Data |
|---|---|
| X | [llo, how a] |
| M | [mai is Awes] |
| W | [elepho] |
| T | [Aka] |
| O | [ome!] |
| ⋮ | ⋮ |
| J | [ppenheimer] |
FIG. 3
| Fingerprint | Data |
|---|---|
| R | [nny Cash in Fol] |
| M | [mai is Awes] |
| W | [elepho] |
| X | [llo, how a] |
| T | [Aka] |
| ⋮ | ⋮ |
| K | [anhatta] |
FIG. 4
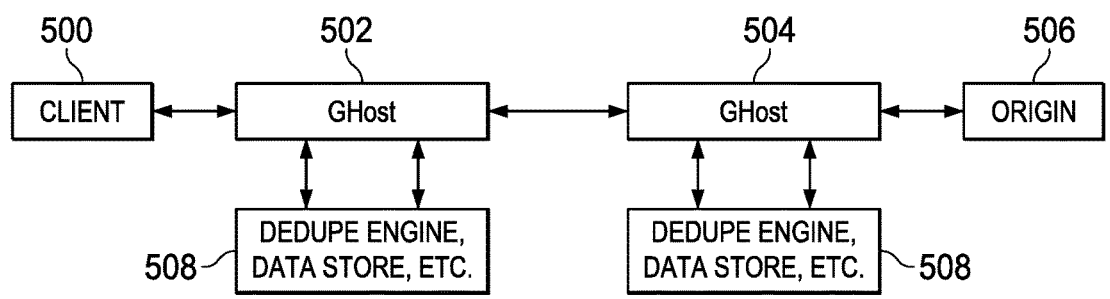
FIG. 5

STREAM-BASED DATA DEDUPLICATION WITH PEER NODE PREDICTION

TECHNICAL FIELD

This application relates generally to data communication over a network.

BRIEF DESCRIPTION OF THE RELATED ART

Distributed computer systems are well-known in the prior art. One such distributed computer system is a "content delivery network" or "CDN" that typically is operated and managed by a service provider. The service provider typically provides the content delivery service on behalf of third parties (customers) who use the service provider's shared infrastructure. A distributed system of this type is sometimes referred to as an "overlay network" and typically refers to a collection of autonomous computers linked by a network or networks, together with the software, systems, protocols and techniques designed to facilitate various services, such as content delivery, application acceleration, or other support of outsourced origin site infrastructure. A CDN service provider typically provides service delivery through digital properties (such as a website), which are provisioned in a customer portal and then deployed to the network.

Data differencing is a known technology and method to leverage shared prior instances of a resource, also known as versions of data within a shared dictionary in compression terminology, between a server and a client; the process works by only sending the differences or changes that have occurred since those prior instance(s). Data differencing is related to compression, but it is a slightly distinct concept. In particular, intuitively, a difference ("diff") is a form of compression. As long as the receiver has the same original file as a sender, that sender can give the receiver a diff instead of the entire new file. The diff in effect explains how to create the new file from the old. It is usually much smaller than the whole new file and thus is a form of compression. The diff between a first version of a document and a second version of that same document is the data difference; the data difference is the result of compression of the second version of a document using the first version of the document as a preset dictionary.

Stream-based data deduplication ("dedupe") systems are also known in the prior art. In general, stream-based data deduplication systems work by examining the data that flows through a sending peer of a connection and replacing blocks of that data with references that point into a shared dictionary that each peer has synchronized around the given blocks. The reference itself is much smaller than the data and often is a hash or fingerprint of it. When a receiving peer receives the modified stream, it replaces the reference with the original data to make the stream whole again. For example, consider a system where the fingerprint is a unique hash that is represented with a single letter variable. The sending peer's dictionary then might look as shown in FIG. 3. The receiving peer's dictionary might look as shown in FIG. 4. Then, for example, if the sending peer is supposed to send a string such as "Hello, how are you? Akamai is Awesome!" the deduplication system would instead process the data and send the following message: "He[X]re you?[T][M]ome!" The receiving peer decodes the message using its dictionary. Note that, in this example, the sending peer does not replace "ome!" with the reference [O]. This is because, although the sending peer has a fingerprint and block stored it its cache, that peer knows (through a mechanism) that the receiving peer does not. Therefore, the sending peer does not insert the reference in the message before sending it. A system of this type typically populates the dictionaries, which are symmetric, in one of several, known manners. In one approach, dictionary data is populated in fixed length blocks (e.g., every block is 15 characters in length) as a stream of data flows through the data processor. The first time the data passes through both the sending and receiving peers, and assuming they both construct dictionaries in the same way, both peers end up having a dictionary that contains the same entries. This approach, however, is non-optimal, as it is subject to a problem known as the "shift" problem, which can adversely affect the generated fingerprints and undermining the entire scheme.

An alternative approach uses variable-length blocks using hashes computed in a rolling manner. In a well-known solution based on a technique known as Rabin fingerprinting, the system slides a window of a certain size (e.g., 48 bytes) across a stream of data during the fingerprinting process. An implementation of the technique is described in a paper titled "A Low-Bandwidth Network File System" (LBFS), by Muthitacharoen et al, and the result achieves variable size shift-resistant blocks.

Current vendors supplying stream-based data deduplication products and services address the problem of dictionary discovery (knowing what information is in a peer's dictionary) by pairing devices. Thus, for example, appliance/box vendors rely on a pair of devices or processes on each end to communicate with each other to maintain tables that let each side know what references exist in the paired peer. This type of solution, however, only works when dealing with individual boxes and units that represent "in path" pairs.

In path-paired solutions, however, are not practical in the context of an overlay network such as a CDN, where the distribution of nodes more closely resembles a tree. Thus, for example, in a representative implementation, and with respect to a particular origin server (or, more generally, a "tenant" located at a "root"), the overlay may have parent tier servers closer to the root, and client edge servers closer to the leaf nodes. In other words, instead of a box needing to be aware of a small set of one or more peer boxes (such as in known box vendor solutions), a parent tier server may need to be in contact with tens, hundreds or even thousands of edge regions, each containing potentially many servers. In this context, per machine tables cannot scale.

Thus, there remains a need to provide enhanced techniques for data deduplication in the context of an overlay network.

BRIEF SUMMARY

An Internet infrastructure delivery platform (e.g., operated by a service provider) provides an overlay network (a "multi-tenant shared infrastructure"). A particular tenant has an associated origin. One or more overlay network servers that are near a tenant origin are equipped with a dedupe engine that provides data deduplication. These servers are dedupe cache parents for that origin in that they receive requests from overlay network cache childs, typically edge servers that are located near to end user access networks. An edge server also includes a dedupe engine. When a request for origin content arrives from an overlay network edge server, the request is routed through a dedupe cache parent for the origin. The cache parent retrieves the content (perhaps from the origin) and then performs a traditional dedupe operation. In particular, the cache parent first looks into its "library" (or "dictionary") for the origin and sees if it can compress the object by replacing chunks of bytes that it has already seen with the names that have already been assigned for those chunks. This operation "compresses" the object in a known manner. The cache parent then sends the compressed object to the overlay network edge server, where it is processed by the edge server dedupe engine. Outside of this delivery loop, however, the dedupe cache parent also processes the object to store newly-seen chunks of bytes, and entering the new chunks into the library (or "dictionary") that it maintains. When the compressed stream is received at the overlay network edge server, the edge server processes the compressed stream by looking for chunks that were replaced by names (or "fingerprints"), and then retrieving the original chunks using the fingerprints as keys into its own dictionary.

If the edge server does not have the chunks in cache that it needs, it follows a conventional CDN approach to retrieve them (e.g., through a cache hierarchy or the like), ultimately retrieving them from the dedupe cache parent if necessary. Thus, if dictionaries between pairs of sending and receiving peers are out-of-sync, relevant sections are then re-synchronized on-demand. The approach does not require (or require a guarantee) that libraries maintained at a particular pair of sender and receiving peers are the same (i.e., synchronized). Rather, the technique enables a peer, in effect, to "backfill" its dictionary on-the-fly in association with an actual transaction. This approach is highly scalable, and it works for any type of content, and over any type of network.

Additional on-the-wire compression between a pair of deduplication engines is provided by maintaining a unique form of data structure on each side of the connection. Preferably, the data structure is a "directed cyclic graph" (DCG), wherein a given DCG represents temporal and ordered relationships between (and among) chunks of data that have been seen in a data stream by the peer. In particular, a DCG comprises one or more nodes, each of which represent a chunk of data, a label that represents or is the fingerprint, and an edge (e.g., an arrow) that represents a transition that the peer has seen in the data stream with respect to that chunk. A node has a set of allowed state transitions. For example, a node that has one just one (1) "out" (an arrow that leads away from the node) is an Intermediate Node, and a stretch of nodes each with degree 1 "out" and that are connected together are referred to as a Strand. A Strand Record defines the particular nodes (and their fingerprints) that comprise a Strand. When the content that traverses the peers has large strings of data (e.g., in file headers) that does not change, it is likely that there will be a large number of nodes in the resulting DCGs that include Strands. Thus, the transmission of Strand Records between cooperating dedupe engines can significantly reduce the amount of information transmitted on the wire during the deduplication process. In particular, once the DCG is in place on both peers, an encoding scheme is then carried out using the Strand Records where appropriate (i.e., where the DCG includes Strands) such that the amount of data that is placed on the wire is substantially reduced (by sending the Strand Record in lieu of the actual node and fingerprint data making up the Strand). Then, when there is a mismatch between the caches, a decoding peer can make a request (a Missing Strand Request) back up to an encoding peer and request the raw data represented by the noted strand.

According to an additional aspect, the directed cyclic graphs that are maintained at each of a set of cooperating peer nodes are further annotated with meta-information to provide an "annotated" (or so-called "predictive") DCG. The meta-information comprises one or more page nodes that each represent where particular chunks originate (typically, their URI-host and path), as well one or more additional edge types, e.g., that identify the chucks that compose the page identified by a page node. The meta-information also includes an indicator (or so-called "heat index") that identifies a number of times a peer (acting as a referrer) has led to the content identified. The use of heat indexes in the new edge types in the DCG maintained on each cooperating peer provides for a prediction structure that enables the peer nodes to send and receive "hinting" requests and responses between themselves that facilitate content pre-warming. In particular, a hinting request is initiated on a child dedupe process (and directed to the parent dedupe process), typically upon receipt at the edge server of a request from a client. During this hinting request phase, the child dedupe process queries whether the child has a page node (in its annotated DCG) for the requested URI. If so, the dedupe process uses the meta-information in its annotated DCG to direct a hinting request at its parent that includes a manifest of chunks (preferably identified only by fingerprint) that it has and that it believes there is a high likelihood of the parent dedupe process utilizing. In this manner, the child is predicting that the parent is able to make use of the chunks the child has already seen. When the parent dedupe process receives hinting request (the manifest) and needs to go forward to the origin, the parent (as it goes forward to the origin) also begins to send data hints back to the child in the form of a hinting response. The hinting response provides the child with information about what the parent believes the page will likely be composed of that the child does not already have, preferably along with what future pages might contain.

The approach of maintaining annotated DCGs on each of the child and parent dedupe peers and providing of hinting requests and responses facilitates a "one round trip" operation in which an entire page (HTML and objects) is sent to a requesting user in the time of a single round trip from client to origin. In this approach, dependent page objects are at the edge server even before the client asks for them. This is sometimes referred to herein as predictive pre-warming of the edge cache.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 2 is a representative CDN edge machine configuration;

FIG. 3 is a sending peer dictionary in a data differencing process;

FIG. 4 is a receiving peer dictionary in a data differencing process;

FIG. 5 is an exemplary wide area network (WAN) architecture for implementing an asynchronous data dictionary approach;

DETAILED DESCRIPTION

Figure 1:
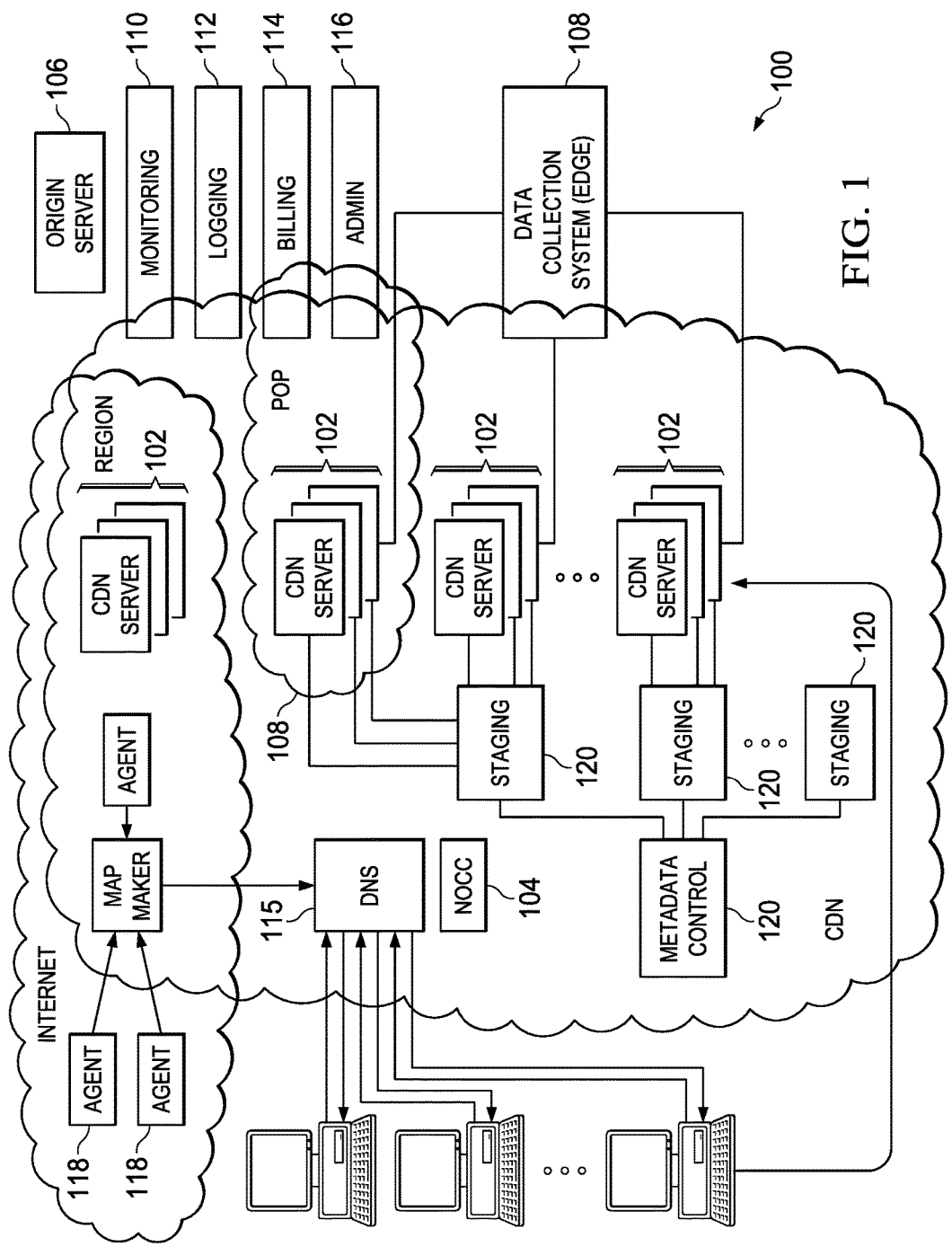
FIG. 1 is a block diagram illustrating a known distributed computer system configured as a content delivery network (CDN)

FIG. 1 illustrates a known distributed computer system that (as described below) is extended by the techniques herein.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

As illustrated in FIG. 2, a given machine 200 comprises commodity hardware (e.g., an Intel Pentium processor) 202 running an operating system kernel (such as Linux or variant) 204 that supports one or more applications 206 (FIG. 2, element 206). To facilitate content delivery services, for example, given machines typically run a set of applications, such as an HTTP (web) proxy 207, a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

An overlay network web proxy (such as proxy 207 in FIG. 2) that is metadata-configurable is sometimes referred to herein as a global host or GHost process.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

As additional background, the techniques described in U.S. Pat. Nos. 6,820,133 and 7,660,296 may be used to facilitate packet delivery between edge and forward proxies in an overlay network such as shown in FIG. 1.

Stream-Based Data Deduplication Using Asynchronous Data Dictionaries

With the above as background, the approach of this disclosure is now described. In contrast to known stream-based data deduplication products and services that address the problem of dictionary discovery (knowing what information in in a peer's dictionary) by pairing, the techniques herein operates according to a different paradigm.

In particular, and for certain sized objects, a peer node is "assumed" to have a block associated with a fingerprint, whether or not it actually does. In this approach, the technique does not require (or require a guarantee) that libraries maintained at either end (of any particular pair of sender and receiving peers) are the same. Rather, in this approach, a library is created, and that library is the allowed to be accessible (e.g., over the web). The library can be located anywhere. As will be seen, this approach enables the standard CDN functions and features to be leveraged, thus providing end users (including those on both fixed line and non-fixed-line networks, and irrespective of application type) both the benefits of deduplication as well as those afforded by overlay networking technologies. In this alternative approach, if the peer does not have the block associated with a given fingerprint, the peer makes a request back to the sending agent to request it. In one embodiment, each block has a particular URI associated therewith, such as a magnet-style URI. A magnet URI refers to a resource available for download via a description of its content in a reduced form (e.g., a cryptographic hash value of the content). An alternative to using a magnet URI is to have a decoding (receiving or child) peer make a request back up to the encoding (sending or parent) peer (or peer region) and request the raw data for whatever chunk is not then available to the decoding peer for decode—using some agreed-upon protocol. Preferably, the processing of data on the decoder side is very fast, and thus a missing chunk is detected and a request sent back to the encoder within some small processing overhead time.

Preferably, special care is taken to avoid extraneous round trips back to the sending peer for blocks that are missing. Therefore, in one embodiment, files that are very small and capable of being sent in one initial congestion window (CWND) are not deduplicated, as the risk of a block cache miss is greater than the payout when the block exists at the receiving peer. This is because the serialization delay into a network I/O card is significantly smaller than the latency that might occur on a cache miss. Thus, preferably only those responses where there is a statistical probability of any advantage using deduplication (even in the face of possible extra latency due to missing blocks) should be considered.

Thus, according to this disclosure, the deduplication system uses an on-demand cache synchronization protocol, which may involve peers communicating with each other explicitly, and that involves a peer making certain assumptions about what another peer might have, or otherwise. According to this protocol, there is an assumption that the decoding peer has a given block of data if the local encoding peer already has it, and an assumption that the decoding peer entity does not have the given block of data if the local encoding peer does not. Further, the system accounts for a mismatch in caches between peers. If this occurs, the mismatch is resolved. To this end, whenever some data (an object, a chunk, a set of chunks, etc. that have been seen in a stream) is not available for decode, the decoding peer makes a request back up to the encoding peer (or region of peers) and requests the raw data needed. As noted above, the processing of data on the decoder side is very fast and thus the missing data is detected and a request sent back to the encoder within only a small processing overhead time. This approach ensures that, irrespective of what cache synchronization protocol is being utilized, there is a fallback mechanism to ensure that a transaction can complete. The missing data support thus handles the possibility of complete cache misses, and it can be used in conjunction with the cache synchronization approach described above.

A representative architecture for implementing a deduplication approach of this type is shown in FIG. 5. For simplicity, a client 500 is shown interacting with an edge GHost process 502, which in turn communicates (typically over a WAN) with a forward GHost process 504 located near a tenant origin 506. Each GHost process 502 and 504 has associated therewith a deduplication engine 508, an associated data store for the dictionary, and other related processes. Collectively, these elements are sometimes referred to as a dedupe module. The cache parent may also implement other technologies, such as front end optimization (FEO). GHost communicates with the deduplication module over some interface. In an alternative embodiment, the deduplication functionality is implemented in GHost natively. When a request for origin content arrives from process 502, the request is routed through the cache parent 504 for the origin. The cache parent 504 retrieves the content (perhaps from the origin) and then performs a traditional dedupe operation, using its dedupe engine 508. In particular, the cache parent first looks into its library and sees if it can compress the object by replacing chunks of bytes that it has already seen with the names that have already been assigned for those chunks. Preferably, a library is shared among multiple CDN customers; in an alternative embodiment, a library is specific to a particular origin. The cache parent 504 then sends the compressed object to edge server process 502, where it is processed by the edge server dedupe engine 508. Outside of this delivery loop, however, the dedupe cache parent 504 also processes the object to store newly-seen chunks of bytes, entering the new chunks into its library. When the compressed stream is received at the edge server process 502, the edge server processes the compressed object by looking for chunks that were replaced by names (or "fingerprints"), and then retrieving the original chunks using the name.

Figure 6:
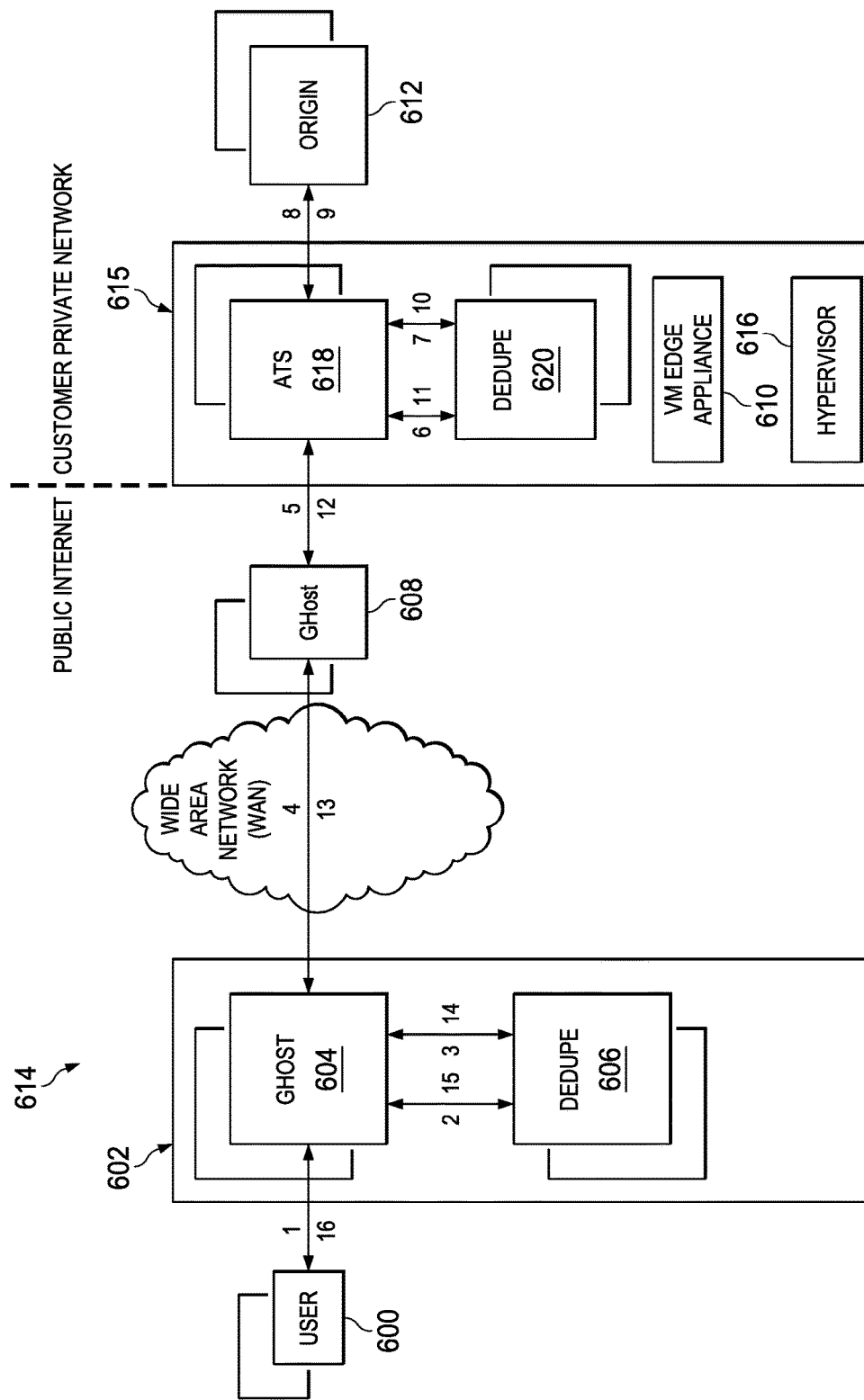
FIG. 6 is a specific embodiment of the technique shown in FIG. 5 implemented within an overlay network and a customer private network.

A more specific embodiment is shown in FIG. 6. In this scenario, an end user 600 has been associated with an edge server machine 602 via overlay network DNS in the usual manner. An "end user" is a web browser user agent executing on a client machine (e.g., desktop, laptop, mobile device, tablet computer, or the like) or mobile application (app) executing on such a device. An "end user" communicates with the edge server machine via HTTP or HTTPS, and such communications may traverse other networks, systems, and devices. Edge server machine executes a metadata-configurable web proxy process (GHost) 604 managed by the overlay network provider, and an associated stream-based data deduplication process 606. As will be described, the dedupe process theoretically performs data compression on all blocks from all files from all CDN customers. In this approach, pieces of a file from a different URI may be used to perform deduplication, as well as pieces from multiple files at the same time. The edge server machine 602 may be a "child" to one or more "parent" nodes, such as a parent GHost process 608 executing on another overlay server appliance (not shown). In this example, GHost process 608 is a "pass-through" and does not provide differencing functionality; it may be omitted.

As also seen in FIG. 6, requests from the client side are directed to an "origin" server 612. The origin (or target) server 612 is a server that typically executes in an overlay network customer infrastructure (or perhaps some other hosted environment, such as a third party cloud-based infrastructure). Typically, origin server 612 provides a web-based front-end to a web site or web-accessible customer application that is desired to be accelerated using the overlay network infrastructure. In this example scenario, which is not intended to be limiting, the origin server 612 executes in the customer's own private network 614. Customer private network 614 includes a physical machine 615. That machine (or some other machine in the customer network) may support another web proxy process 618, and an associated dedupe process 620. Web proxy 618 need not be metadata-configurable, nor does it need to be managed actively by the overlay network. The architecture shown above is not intended to be limiting, but rather is provided as just an example.

The following is a description of an end-to-end flow. In this scenario, and as noted above, "GHost" refers to a metadata-configurable web proxy process executing on an edge appliance in an overlay network, "ATS" refers to an overlay network web proxy process executing on an appliance within a customer network or infrastructure but distinct from the overlay network, and the de-dupe process can perform de-duplication with respect to all blocks from all files local to the specific customer's network (in this example embodiment). As noted above, and depending on the network architecture employed, a library may also be shared so that the associated de-dupe process can perform de-duplication with respect to all blocks from all (or some number of the) overlay network customers. In the illustrated embodiment, a GHost (or ATS) process as the case may be communicates with an associated dedupe process via an interface (e.g., localhost).

In a representative (but non-limiting) implementation as shown in FIG. 6, the overlay network provider provides software that runs within a customer's infrastructure (the private network), e.g., as a virtual machine (VM) or "edge appliance." The edge appliance 610 preferably is located either in the DMZ or behind an enterprise firewall and it may execute on a hypervisor (e.g., VMware ESXi (v. 4.0+)) 616 supported and managed by the overlay network customer. In one preferred embodiment, the edge appliance is distributed as a 64-bit virtual appliance downloaded via an overlay network customer portal (extranet). Each edge appliance requires at least one publically routable IP address and may be configured by the overlay network, preferably over a secure connection.

Thus, according to the above approach, at least one server associated with a tenant origin is equipped (or associated) with a dedupe engine. When a request comes for content from an edge server, the request is routed through a dedupe cache parent for the origin. The cache parent retrieves the content (perhaps from origin) and then, depending on the content size and any applicable configuration parameters, performs deduplication. If deduplication occurs, the parent cache examines its dictionary; if it can compress the object (by replacing chunks of bytes that it has already seen with the names that have already been assigned for those chunks), it does so. The cache parent then sends the compressed object to the edge server. Separately, the dedupe cache parent processes the object to store newly-seen chunks of bytes, entering them into the library that it maintains. When the compressed object is received at the edge server, as described above, the edge server processes the compressed object by looking for chunks that were replaced by names and then retrieving the original chunks using the names, as has been described.

Generalizing, according to this disclosure, as a stream goes through/traverses a parent node, the parent node breaks the stream into chunks. For every chunk, the parent then makes what is, in effect, a "guess" regarding whether the child node to which the stream is being sent has that chunk. The "guess" may be informed in any way, e.g., it may be statistical, probabilistic, based on some heuristic, be derived based on executing an algorithm, be based on the relative location of the child, be based on load, latency, packet loss, or other data, or be determined in some other manner. If the parent's belief is that the child does not have the chunk already, it sends the actual data. If, however, the parent's belief is that the child likely has the chunk, then the parent just sends the name/fingerprint. As the child gets the encoded stream and begins to decode the stream, for every chunk reference/name, the child then looks up the name in its own local library/dictionary. If the chunk is there, the child re-expands it. If, however, the chunk is not present, the child performs an on-demand request (e.g., to the encoding peer/region) requesting the actual data for the chunk.

With this approach, all the known benefits of a CDN (e.g., load balancing, caching, WAN acceleration, and so forth) are leveraged. Importantly, the edge server does not need to maintain a symmetric library for the origin. Of course, the edge server might well have the chunks in cache but, if it does not, it follows the usual CDN-like procedure to retrieve them (e.g., through a cache hierarchy or the like), ultimately retrieving them from the dedupe cache parent if necessary.

The GHost process has the capability of determining whether a request is to be handled by the deduplication process. One technique for making this determination uses tenant-specific metadata and the technique described in U.S. Pat. No. 7,240,100.

The dedupe module may run as a buddy process or an in-process library with respect to GHost. The communication mechanism between GHost and the module may be over shared memory, localhost, TCP, UDS, or the like. In an alternative embodiment, the client-side dedupe module itself may be placed directly on a client device, such as an end user client (EUC) network machine, a mobile device handset, or the like.

Preferably, whether dedupe is turned on may be controlled by metadata configurations, preferably on a per-tenant basis.

As noted above, preferably the dedupe mechanism is not invoked for files that are too small. Small object aversion support thus provides a way to intelligently avoid performing otherwise risky deduplication operations that might incur an extra RTT on a cache miss. In one approach, this may be accomplished by having GHost bypass the dedupe operation for POSTs and responses that include a "Content-Length" header under a certain threshold. Most dynamic content, however, uses chunked transfer encoding, which means that the size of the object is not known in advance. Thus, absent some determination to avoid deduplication based on other criteria, GHost should pass the request through the mechanism described.

In addition, preferably the fingerprint is only sent when there is good assurance that the other side may have the data. Thus, preferably the fingerprint is only sent if the block was seen in the same or a prior stream.

Some file formats (like Huffman encoding) are heavily compressed as well as jumbled. Commercial deduplication systems often offer systems within their deduplication engines to decode those file types into more deduplication-friendly formats prior to performing fingerprinting and chunking. Such approaches may be implemented herein as well. In particular, each side (whether in GHost or in the dedupe module itself) may implement per file format decompression filters to better ensure cached block hits.

The GHost/dedupe module solution described herein may also interoperate with protocol terminators. Protocol terminators are pieces of software that terminate a protocol (such as CIFS or MAPI) and convert it, e.g., to http or http(s).

The dedupe module may interoperate with other CDN mechanisms, such as FEO techniques.

As shown in FIG. 6, 1 dedupe module as described herein may be located within an enterprise network, such as in a machine associated with the overlay network that is located in an enterprise DMZ.

As also shown in FIG. 6, a dedupe module as described herein may be located within a virtual machine (VM) associated with an enterprise that uses or interoperates with the overlay network. This architecture is not a limitation, however, as the forward proxy need not be positioned within an enterprise (or other customer private network).

The dedupe techniques described herein may be used in association with one or more other CDN service offerings, to facilitate CDN node-to-node communications (in-network deduplication), or the like.

The GHost and dedupe modules are implemented in software, executed in one or more processors, as a specialized machine.

There is no limitation on the type of data that may be processed by the described technique. Indeed, for certain data types (such as PII), data deduplication such as described herein has significant advantages over caching alone.

The dedupe function may be implemented in a daemon process, namely, as a set of computer program instructions executed by a hardware processor. The daemon may function as both the client and the server in the HTTP-based protocol described above. Preferably, it is shunted into or onto the servers (e.g., GHost) at the ends of a high latency leg of communication within an overlay network. As described above, preferably metadata configuration data determines whether a particular request (on the sending side of the connection) should be considered a request that should be accelerated using the protocol.

In general, the approach described herein enables the overlay servers to remove redundant data it is sending between peers on the network, instead sending much smaller fingerprints. This reduces the overall size of the data on the wire drastically for transactions that have high amounts of duplicate data, thus reducing the amount of time for delivery to the end user. In addition, the reduced data results in lowered operating costs on the network as the amount of information transferred and the bandwidth requires decreases.

The above-described approach is highly scalable, and it works for any type of content, and over any type of network. The client is a conventional desktop, laptop or other Internet-accessible machine running a web browser or other rendering engine (such as a mobile app). The client may also be a mobile device. As used herein, a mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., iOS™-based device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. In a representative embodiment, the mobile device is a cellular telephone that operates over GPRS (General Packet Radio Service), which is a data technology for GSM networks. A mobile device as used herein may be a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Directed Cyclic Graphs

Fingerprinting (using SHA-1 for example) provides hashes that are 20 bytes in length, and, in one implementation of the above-described technique, typically replaces blocks in the data stream that have an average size of 128 bytes, thus creating a maximum theoretical compression limit of 20/128=15%. To increase that percentage, an additional compression mechanism preferably is used. This mechanism provides wire compression, and it is referred to as the Directed Cyclic Graph method (DCG). It is now described.

Figure 7:
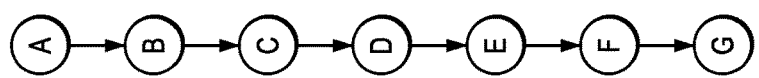
FIG. 7 illustrates a representative directed cyclic graph (DCG) of a set of chunks of data that have been seen by a peer in the deduplication scheme described.

As used herein, a directed cyclic graph (DCG) represents temporal and ordered relationships between (and among) chunks of data that have been seen in streams passing between peers (that execute dedupe engines in the manner described above). Each node (e.g., a circle) in a DCG represents a chunk of data. Its label preferably denotes a fingerprint (in practice fingerprints are much larger, but this shorter notation is for descriptive purposes). Each edge (e.g., an arrow) in a DCG represents a transition that the machine has seen. Now, assume that the first time a deduplication system such as described above in FIG. 6 loads and sees a stream of data; the resultant fingerprints are: [A][B][C][D][E][F][G]. This nomenclature means that the machine has seen chunk [A] followed by [B] followed by [C], and so on for chunks [D][E][F][G]. An initial directed cyclic graph of these fingerprints would then appear as shown in FIG. 7.

By convention, nodes A through F are Intermediate Nodes. An Intermediate Node then is any node with degree "out" (outward) of exactly one (1). Node G is a Terminal Node. A Terminal Node is a node that has degree out of exactly zero.

Figure 8:
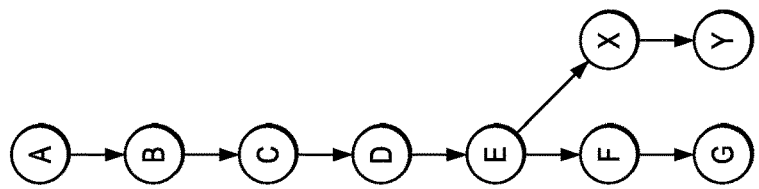
FIG. 8 illustrates a modification of the DCG in FIG. 7 following receipt of another stream of data at the peer.

Now, assume another stream of data comes in to the peer node and that is processed with the following fingerprints: [B][C][D][E][X][Y]. This operation would internally modify the DCG of FIG. 7 to look like FIG. 8. In this example, a new type of node has been introduced and is referred to as an Overflow Node. An Overflow Node is a node with degree out greater than one. In FIG. 8, this is node E.

According to the DCG scheme of this disclosure, a node in a DCG has a set of state transitions. Preferably, the allowed state transitions for a node in the compression DCG scheme are then as follows. Nodes begin life in a Terminal Node state, and nothing follows them. Once another node follows the node in question, its state transitions to Intermediate, and it may never go back to the Terminal state again (as its degree out has forever been changed). If any other nodes (other than the one already mentioned) ever immediately follow the node in question, its state transitions to Overflow, and again the state may not transition back to Intermediate or Terminal (as its degree out has been forever altered).

Once the directed cycle graph is in place on both peers, a variant of run length encoding is then carried out, as will now be described. Assume another stream of data is seen that looks like the following: [A][B][C][D][E][X]. When sending the fingerprints to the decoding peer, the encoder may then state as follows: start at node A (FIG. 8) and "go down four steps." (There is no ambiguity in this if the DCGs on each peer are in sync). Because each node has degree out of exactly one, it is clear what nodes to which this instruction refers. Then, at node E, a decision must be made because this is an Overflow Node. In other words, the encoder must direct the decoding peer which branch to traverse. It does this by simply sending a new record for X.

According to this scheme, these stretches of nodes with degree out of one that are connected together are called Strands. When communicating with a peer, the sending peer sends a Strand Record that represents the wire data. It is possible that a DCG on one peer could fall out of sync with the graph on another peer. In that case, it is possible that the encoding peer would instruct the decoding peer to start at a particular node and go down a certain number of steps, and that the decoding peer is capable of doing this but the data is different. According to an aspect of the DCG scheme, this is guarded against by providing a hash of the fingerprints that are to be traversed. Therefore, a Strand Record preferably is composed of the following tuple:

[Starting Fingerprint] [Number of Nodes] [Hash of Nodes Below Starting Fingerprint]

If the decoding peer cannot verify the Strand Record's signature, then preferably the decoding peer sends a Missing Strand Request to the encoding peer, as described in more detail below.

Figure 9:
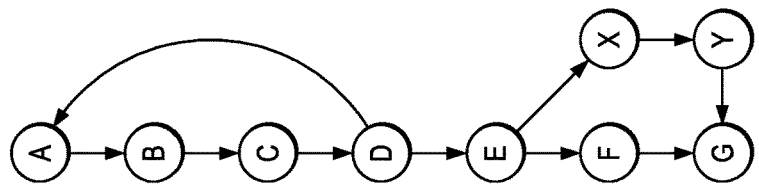
FIG. 9 illustrates a modification of the DCG in FIG. 8 to illustrate how a portion of the stream may loop back on itself.

Returning back to the DCG terminology, the purpose of the "cyclic" part of the graph can be seen by way of an example. Often, there may be circumstances where a strand loops back in on itself. For example, using the above examples, a peer might see a stream that looks like the following: [A][B][C][D][A][B][C][D][A][B][C][D][A][B][C][D][E][X][Y][G]. This would generate a DCG such as shown in FIG. 9. Then, if at a later time if the following data stream were sent: [A][B][C][D]×100[E][X][Y][G], the following would be output: [A:3:HASH(B·C·D)][A:3:H(B·C·D)] . . . [E:3:HASH(X·Y·G)], where the [A:3:HASH(B·C·D)] sequence appears 100 times. To avoid this repetition problem, and according to this disclosure, the output of the DCG may be passed through a deflation algorithm. An algorithm that uses Lempel-Ziv-77 (or equivalent) to remove repetition in the stream may be used for this purpose. In addition, a coding, such as Huffman Coding, may also be used to minimize the size of the output tokens. This approach can compress the 100 A Strand Records (in this example scenario) into a single token sequence.

The DCG approach as described above facilitates significant on-the-wire compression. Indeed, many file formats have large strings of data in file headers that simply do not change. In addition, many file types (e.g. Microsoft PowerPoint files, Microsoft Word files, and the like) routinely have stretches of thousands of fingerprints with degree out of one. This is intuitively correct, as low entropy files generally do not change much from one version to the next. The stretches that do not change are represented by long strands of nodes with degree out of one. This content is then processed into Strand Records that, in turn, may be processed as described above such that the information on-the-wire is greatly reduced. In practice, the DCG method compresses significantly tighter than GZIP and other known techniques.

In summary, by instantiating and maintaining directed cyclic graphs at each side of the communication, on-the-wire data compression is facilitated. In particular, DCGs provide a way to compress data based upon temporal locality (at a respective peer) of ordered chunks within similar prior-seen data.

Cache Synchronization Using Missing Strand Requests

As noted above in the discussion regarding FIG. 6, preferably the deduplication system uses a cache synchronization protocol that involves peers communicating with each other explicitly, e.g., by a peer making certain assumptions about what another peer might have, or otherwise. No matter what cache synchronization protocol exists, the system should account for the fact that something could occur to cause a mismatch in caches between peers. If this occurs, it must be possible to resolve the mismatch and make forward progress. Thus, according to a further feature of this disclosure, the notion of Missing Strand Requests addresses this problem. In particular, whenever a strand is not available for decode on the child, the decoding peer (the child) can make a request back up to the encoding peer (or region of peers) and request the raw data for the noted strand. The processing of data on the decoder side is very fast and thus a missing strand should be detected and a request sent back to the encoder within only a small processing overhead time. This approach ensures that, irrespective of what cache synchronization protocol is being utilized, there is a fallback mechanism to ensure that a transaction can complete. The missing strand support thus handles the possibility of complete cache misses, and it can be used in conjunction with the cache synchronization approach described above (namely, assuming that the decoding peer has a given block of data if the local encoding peer already has it, and assume the decoding peer does not if the local encoding peer does not).

A Missing Strand Request is a mechanism by which a downstream peer can request (from an upstream peer) a particular section of a DCG along with its associated raw data so that the downstream peer has sufficient data to enable it to reproduce and store the graph and blocks on its side. It provides a cache synchronization method that, together with the use of directed cyclic graphs, results in significant performance enhancements.

Whether Strand Records are sent down the wire to the decoding peer (in lieu of the raw data itself) may be implementation-, or context-dependent. When the Missing Strand support (as described above) is in place, there may be an assumption that the decoding peer has a given block of data if the local encoding peer already has it, and that the decoding peer does not if the local encoding peer does not; these assumptions may be appropriate in certain circumstances as, if there is a cache miss, the missing strand support is activated. The conclusion that Strand Records thus should always be used, however, need not necessarily follow. The more two peers communicate with each other, the more often the Strand approach works as items seen first by one are also seen first by the other. When the longevity of peer communication in general is short, however, relying on the above assumptions can lead to a parent believing a child has content just because the parent has it locally. In a scenario where a parent for a hot piece of data talks to a first edge region and synchronizes appropriately, every other edge region that the parent talks to after this will incorrectly be assumed to have the data. Accordingly, the use of Strands will be most appropriate for hot content, as for any given child decode region, that region will only suffer a stall for the first user that needs to download the missing strand. While this user will suffer an additional RTT to fetch the strand, deduplication will still have saved sufficient time on the download (such that the additional RTT might not be noticed) All subsequent users, however, will then benefit from the hot cache.

As a variant, other heuristics may be factored into the decision of when to send just a Strand as opposed to the backing data. For example, if the parent encoding peer has a strand but has not talked to a peer region that is in-line to receive the stream for a given configurable time, the parent can gauge the risk of sending just the strand record based on the RTT. If it is determined that there may be too great a penalty on a cache miss, the raw data may then be sent in lieu of the strand.

Cache synchronization using Missing Strand Request processing as described herein provides a robust and reliable mechanism to keep pairs of disparate dictionaries synchronized on demand and when needed during the deduplication process (i.e., while traffic is flowing through (transiting) the dedupe peers).

The use of directed cyclic graphs and missing strand requests as described herein finds particular utility in providing on-the-wire compression between an edge server and a parent in the context of an overlay network. That particular use scenario is not intended to be limiting, however, as the techniques herein may be used between any two computing entities including, without limitation, client and edge server, forward server and origin, and the like.

Annotated DCG and Predictive Pre-Warming (PPW)

The following section describes a further enhancement to the deduplication process, which enables the passing of deduplication hints between nodes on the network; this approach enables a node to prepare for future transactions by having relevant portions of data already at a child edge prior to the client's request (e.g., for an embedded page object of an HTML page). This predictive capability is composed of three (3) elements: a prediction structure, a hinting request, and a hinting response. The prediction structure is sometimes referred to as an annotated DCG.

Figure 10:
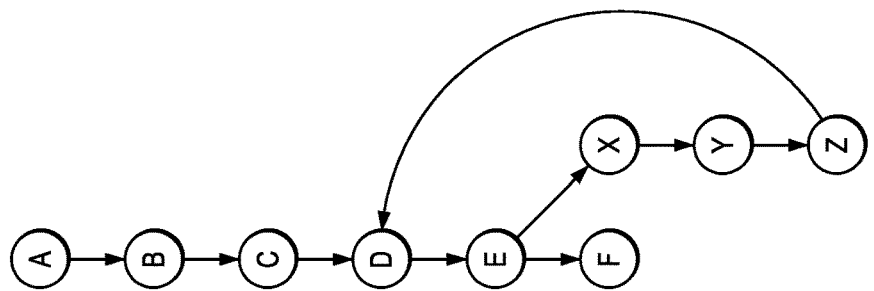
FIG. 10 illustrates a representative DCG maintained at a peer.
Figure 11:
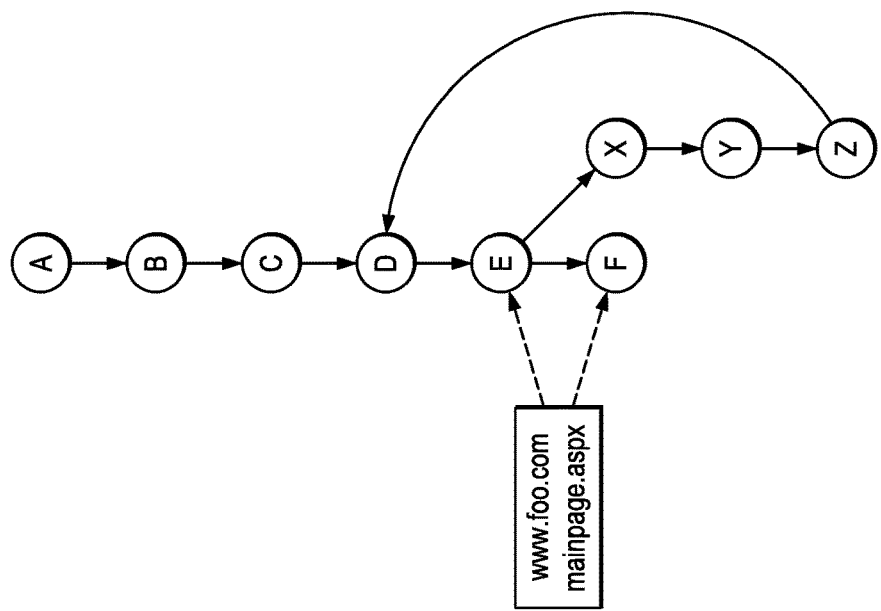
FIG. 11 illustrates the DCG of FIG. 10 annotated to include a page node according to this disclosure.

FIG. 10 illustrates a representative DCG, as has been described. Preferably, this data structure is maintained on both parent and child nodes (each having Ghost/dedupe processes). As described, each node (circle) represents a chunk of data; its label denotes a fingerprint. Each edge (arrow) represents a transition that the machine has seen. According to this disclosure, a DCG is annotated to facilitate predictive capabilities, preferably as follows. A DCG may be annotated to include a page node, such as shown in FIG. 11. A page node does not represent a specific chunk of data seen in a stream but, rather, meta-information of where chunks come from (namely, their URI-host and path). In addition, a new edge type called a composed of edge may be specified. In a representative DCG, a page node is identified with a rectangle, and a composed of edge is shown with dotted arrows. Thus, assuming the page www.foo.com/mainpage.aspx is composed of chunks e and f (in FIG. 10), the graph would then be annotated in the manner shown in FIG. 11. Thus, if a user with a client browser requests a page at that URL, the page downloads through the overlay network and is composed of chunks e and f. Assuming that the parent node started with the DCG in FIG. 10, after that node delivers the page, its DCG would look as shown in FIG. 11. Typically, a similar annotation would be present on the edge node that serves the response to the client request.

Figure 12:
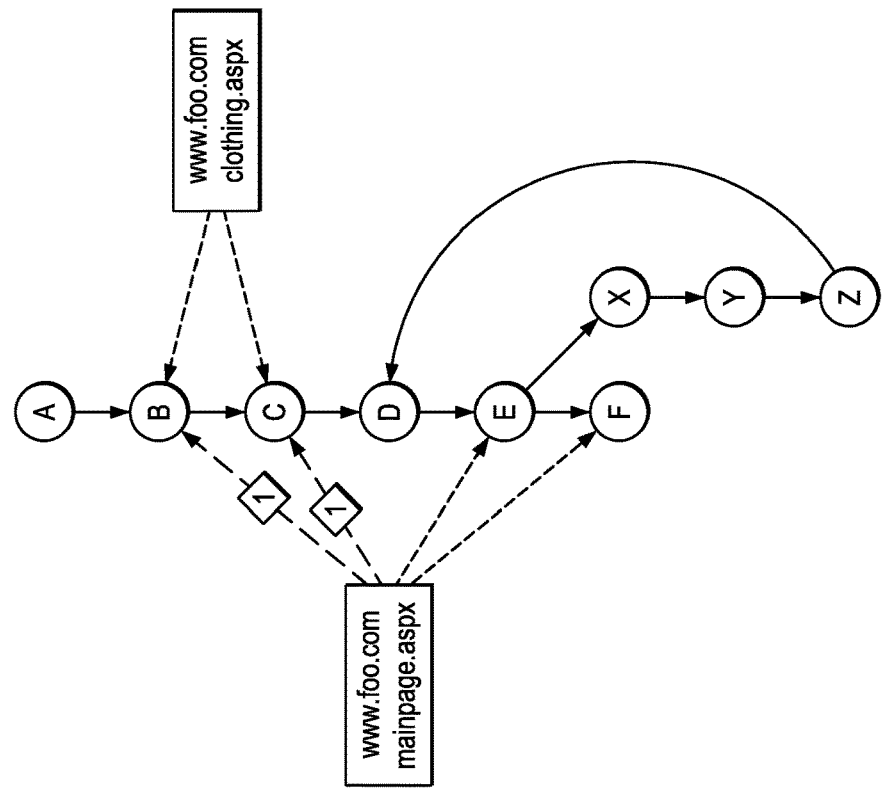
FIG. 12 illustrates the DCG of FIG. 11 annotated further to include a leads-to-edge annotation together with an associated heat index.

Another annotation that may be provided is a new type of edge called a leads to edge. This edge is denoted in the graph with dashed arrows and includes a diamond with a number in it that is referred to as the edge's heat index. (The above-described graphical representations are merely for explanatory purposes, as other conventions may be used without departing from the concepts herein). This annotation is best explained by example. Assume that after the client downloads the mainpage.aspx in the earlier example, he or she clicks on a link on that page that was for clothing.aspx. Recall that when the client browser makes the request, a REFERER header is attached that lists mainpage.aspx as the page referrer. The nodes servicing the request can see this header. Also, assume that the new page is composed of chunks b and c. The graph is then updated to note that the new page node for clothing.aspx is composed of chunks b and c, and additionally that the mainpage.aspx page node lead to those chunks. As noted, each leads to edge has a heat index associated with it that marks the number of times the parent page node has led to this content. The graph is now updated to look as shown in FIG. 12.

Figure 13:
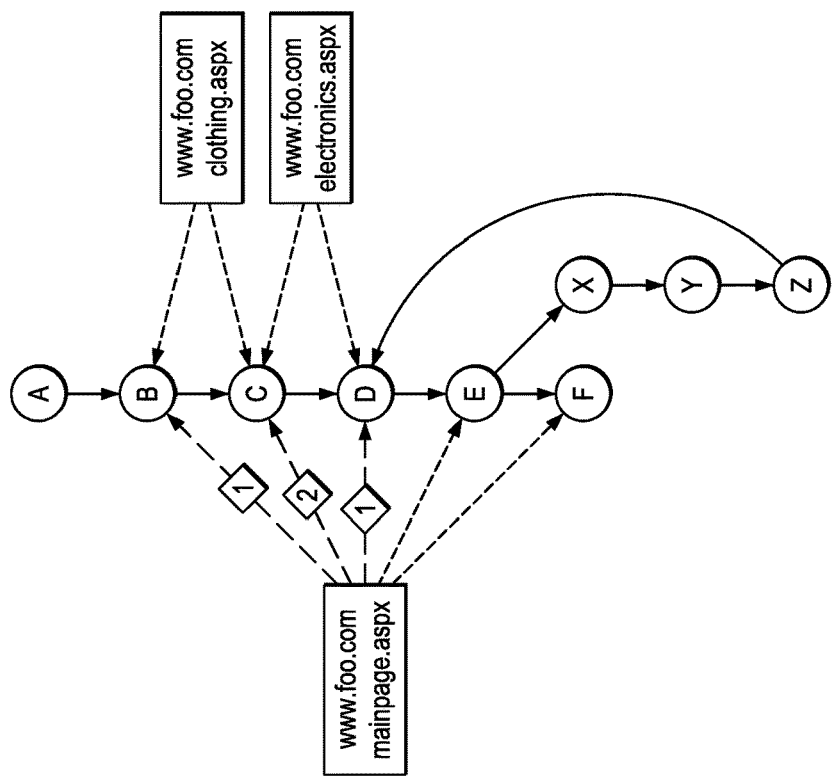
FIG. 13 illustrates a further modification of the DCG of FIG. 12 annotated further to include additional leads-to-edges and their associated heat indices.

By way of further example, assume that the user in this example clicks the back button in his or her browser and is then interested in the electronics section of foo.com. He or she then clicks on the electronics link from the mainpage.aspx and the page downloads through the overlay network (again with a REFERER of mainpage.aspx). Assume further that the new electronics page is composed of chunks c and d, and further that the electronics page has chunk c in common with the clothing page (this might be some internal Javascript or CSS that all pages share on foo.com, for example). The graph now changes to look as shown in FIG. 13. In FIG. 13, it should be noted that the leads to edge from mainpage.aspx to chunk c now has a heat index of 2. This is because this chunk was lead to from mainpage.aspx on two separate occasions (once going to clothing.aspx and another time going to electronics.aspx).

Figure 14:
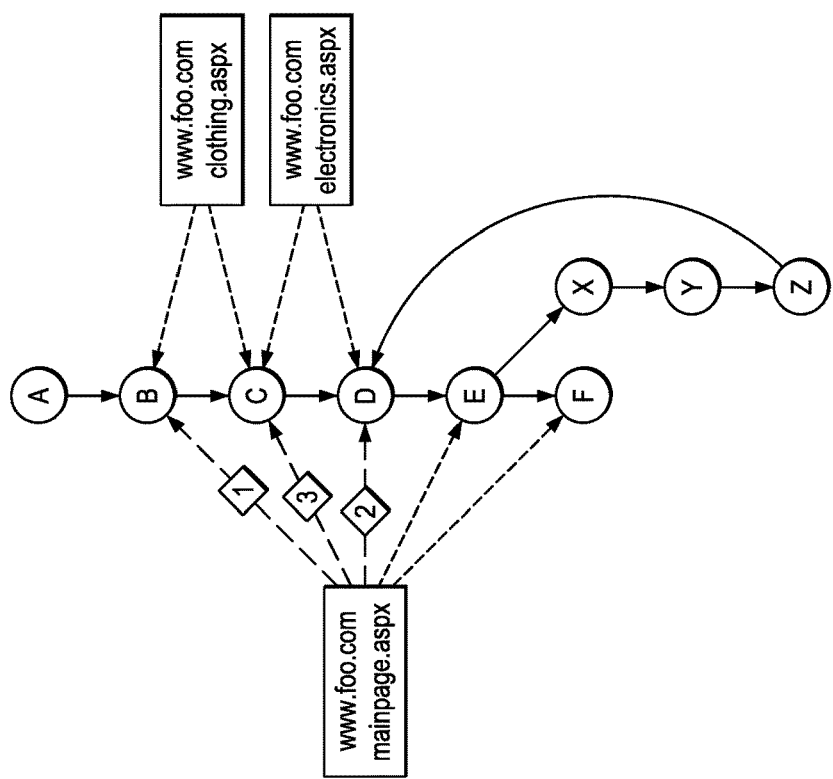
FIG. 14 illustrates a further updated version of the DCG of FIG. 13.

Continuing with this example, assume now that a brand new user visits mainpage.aspx freshly in his or her newly-opened browser, and then visits electronics.aspx via the same link from the main page. The graph would then update to look as shown in FIG. 14. Note in this drawing how the heat indexes have updated once again when this occurs.

The annotated DCG and, in particular, the use of heat indexes in the leads to edges provides the prediction structure. As noted above, preferably this structure is created, updated and maintained on both sides of the overlay network connection (typically between a parent peer near an origin, and a child pair at an edge). In other words, the DCG (and its predictive structures) live on both parent and child nodes.

Assuming the existence of the annotated DCG (including its predictive structure), the following describes a hinting request phase of a predictive pre-warmed (PPW) deduplication transaction according to this disclosure. In particular, when a client makes a request to the edge (and its dedupe process), the edge dedupe process modifies the request (e.g., using a protocol extension to HTTP, or otherwise) to include a manifest of chunks (identified only by fingerprint) that it has and that it believes there is a high likelihood of the parent dedupe process utilizing. The child node then forwards this request onto the parent (assuming that the edge GHost did not have it in cache). Preferably, the dedupe process at the child assembles this manifest by examining the predictive DCG. For example, assume that the client in this example requests mainpage.aspx from earlier. The child dedupe process would examine its associated predictive DCG (assume the predictive DCG image in FIG. 14) and see that the last time mainpage.aspx was downloaded through this node, it was composed of chunks e and f of which the edge dedupe process still has in its cache. Thus, the process would add those chunk fingerprints to its manifest to send upstream. In addition, the child dedupe process sees (from its predictive DCG image) that mainpage.aspx leads to a series of other chunks. The child then picks the chunks that mainpage.aspx leads to that have the highest heat indexes (with some configurable lower limit) and adds those to the manifest as well. For example, assume the chunks that it picks are c and d, and that it ignores chunk b because the heat index is too low for it (just 1). The child dedupe process would then append to the forward request fingerprints c, d, e, and f, which would let the parent dedupe process know that the child process has that data present.

This allows the parent dedupe process to simply send the fingerprints back to the child process if the associated data is encountered again with the certain knowledge that the data will be present and not require a Missing Strand Request due to a cache miss on the child side. In essence, the child is predicting that the parent is able to make use of the chunks the child has already seen. This leads to better performance, as the parent is more informed about what the child has and can make very accurate decisions of when to send downstream raw data versus just fingerprints.

Figure 15:
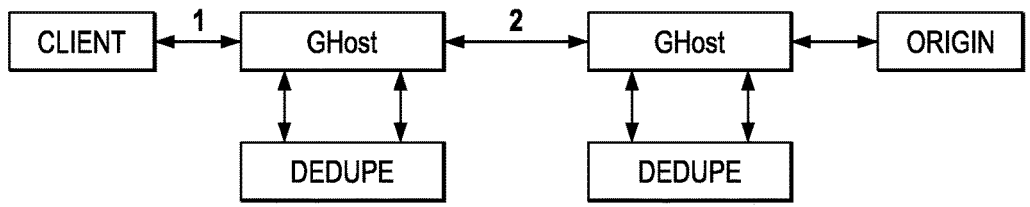
FIG. 15-18 illustrate how a predictive pre-warm process may be implemented in the overlay infrastructure of FIG. 6.

FIGS. 15-18 illustrate this process. Turning first to FIG. 15, in step 1, the client requested mainpage.aspx. In step 2, the child dedupe process has forwarded the request to the parent dedupe process (directly, or via the parent side GHost) with fingerprints c, d, e, and f attached. The parent dedupe process, upon receiving this data, knows that it has to download mainpage.aspx from the origin. It also knows that this is going to take some time, at minimum the round trip time (RTT) between the parent edge and the origin. Instead of just sitting idly during this time, preferably the parent dedupe process begins to send data hints to the child dedupe process based on what it believes the page will likely be composed of that the child does not already have, preferably along with what future pages might contain. Thus, for example, assume that the parent dedupe's predictive DCG looks like FIG. 19. This differs from the DCG (FIG. 14) in two interesting ways. First, it has stored that the last time the parent saw mainpage.aspx it was composed of chunks e, f, and g. (The child dedupe process only thought chunks e and f were used.) Second, the parent has apparently been used to download music.aspx, which was linked from mainpage.aspx. This page is composed of only chunk h and (in this example) was reached nine times via mainpage.aspx, raising the heat index of the leads to edge for chunk h in relation to mainpage.aspx to 9. The parent, having received the hints in step 2 from the child that note that it has chunks c, d, e, and f, believes that there is value in the child having chunk g (because the mainpage.aspx it has seen was composed of that as well) as well as chunk h (due to the extremely high heat index). Therefore, simultaneously while it sends the request forward to the origin, the parent also sends the data for chunks g and h backward to the child. In other words, the parent is preparing the child for data it predicts it may need.

Figure 16:
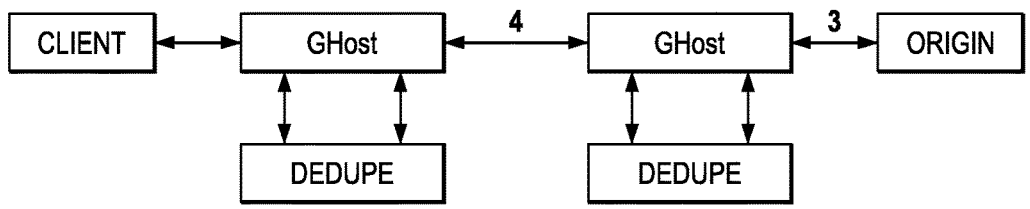

This operation is shown in FIG. 16. In particular, step 3 is the request to origin and step 4 is the hinting response to the child. Preferably, steps 3 and 4 are happening simultaneously.

Figure 17:
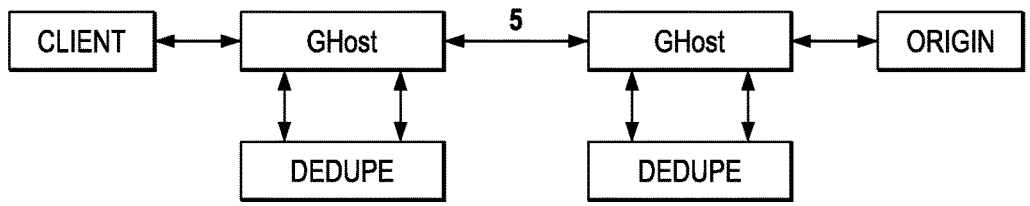
Figure 18:
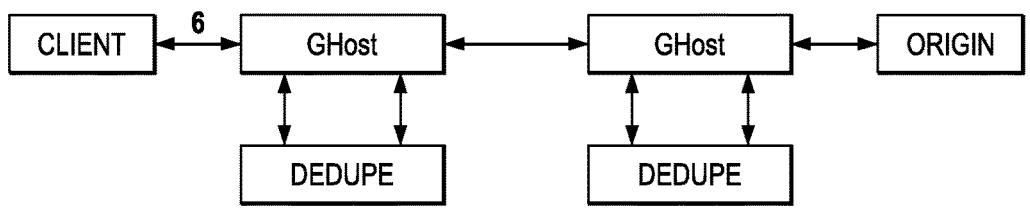
Figure 19:
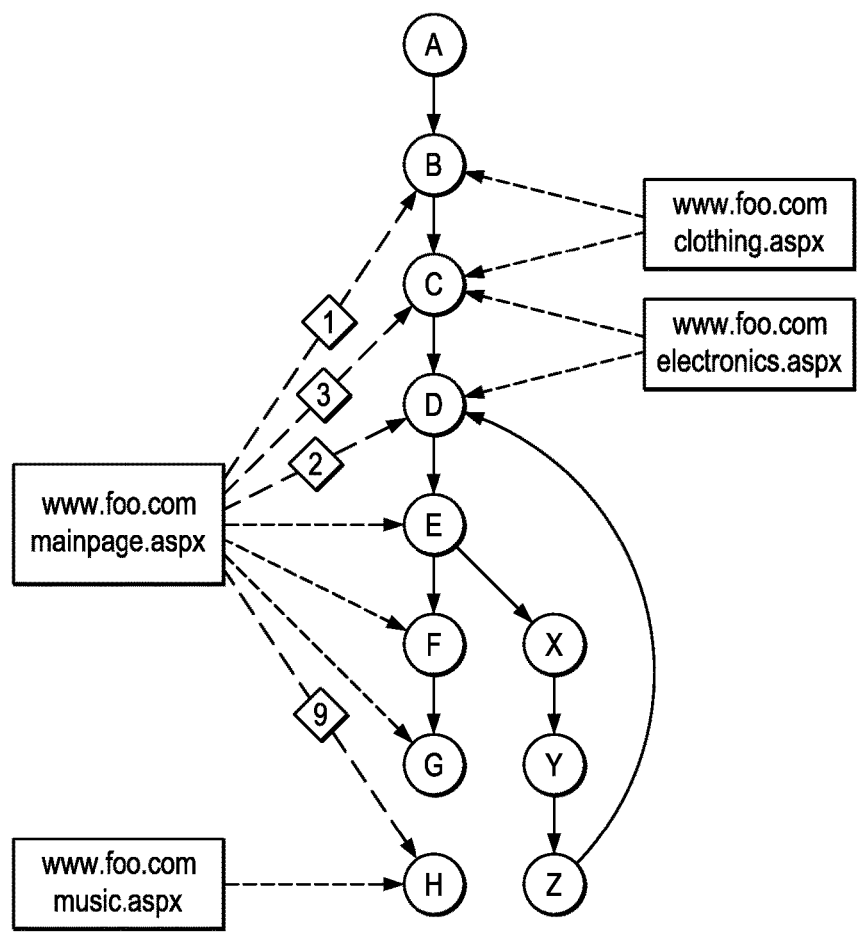
FIG. 19 illustrates the parent nodes predictive DCG during the predictive pre-warming.

Now, assume that the origin has responded back to the parent dedupe process and the mainpage.aspx is composed of chunks e, f, g, and i. The parent process knows that the child dedupe process told the parent that the child has chunks e and f. In addition, the parent dedupe process knows that it has pre-seeded the child with the g chunk. Therefore, the parent dedupe process knows it need only send the fingerprints for e, f, and g; because i is new to the parent as well, it must send the raw data for i. This is shown in FIG. 17 as step 5. Finally, the child dedupe process receives the fingerprints for e, f, and g and expands them back to the data they represent. In addition, the child process receives the raw data for i and stores it in its DCG and cache, as well as transmitting it directly to the client. This is shown in FIG. 18 as step 6.

Now, assume that the client gets this page and then requests the popular music.aspx page. When the child dedupe process receives the request, it notes that it has never seen music.aspx before, but it has seen the REFERER of mainpage.aspx. In this scenario, it does a slightly modified version of the hint request and simply sends a manifest of the hottest leads to nodes the REFERER has, hoping that the page that is being requested will be composed of some of them (because the REFERER denotes that it leads to this newly requested page as well). Thus, the child process sends chunk fingerprints forward for c, d, and especially h. The parent dedupe process sees that it has a music.aspx page node and that it is composed of chunk h only. Because the child indicated it had that, in this case the parent does not send anything additional towards the child for the hint response.

Further, assume that the origin responds and the page has not changed (it still is solely composed of chunk h). The parent dedupe process knows from the hint request that the child has chunk h and it can safely send just the fingerprint back. It does this, and the child process receives it, expands it, and delivers it to the client.

As can be seen, the predictive seeding from the first request placed data on the child edge before it was even asked for. Then when it was time to deliver that data, the data was already present on the child edge, thus resulting in an effective single round trip through the system.

Generalizing, the hinting request phase on the child dedupe process is initiated (upon receipt at the edge GHost of a request from a client) by querying whether the child has a page node for the requested URI. If so, (a) the dedupe process sends the composed of nodes fingerprints forward in a manifest up to a certain configurable limit. If there is still room, the child process also begins sending the hottest (by heat index) leads to node fingerprints forward in the manifest as well (up to a configurable limit). If a page node for the requested URI is not present and there is a REFERER, and if the REFERER has a page node in the child DCG, (b) the child sends the REFERER leads to node fingerprints forward in the manifest (up to a configurable limit). If neither (a) nor (b) occurs, no manifest is sent.

On the parent dedupe process, the following comprise the steps for the hinting response. The parent first creates an ordered response queue Q. It then performs a test to determine if it has a page node for the requested URI. If so, (a) the process loads into the queue all of the composed of nodes, and then all of the leads to nodes. If not and there is a REFERER, and if the REFERER has a page node in the parent DCG, then the parent (b) loads into the queue all of the leads to nodes. If neither (a) nor (b) occurs, nothing is loaded into the queue. After performing one of these three options, the parent removes from the queue all nodes that the child has sent fingerprints for. If anything remains in the queue, the parent begins sending the data back to the child simultaneously while sending the request forward to the origin. Preferably, the parent only sends (back down to the child) up to a configured limit of data to avoid adding too much traffic to the network.

While the parent is sending hints to the child, it is possible that the origin's data arrives on the parent before the hint response is complete. In that instance, the parent should halt sending the hints to the child and begin sending the deduplicated stream immediately. Once complete, it may resume sending data to the child that the child has not already seen in the current transaction. In an alternative embodiment, such data might be sent on a separate connection.

The above-described approach facilitates a "one round trip" operation in which an entire page (HTML and objects) may be sent to a requesting user in the time of a single round trip ("1RTT") from client to origin. As has been described, in the 1RTT in which the HTML is delivered, the approach may enable dependent objects are at the edge even before the client asks for them.

The above-described approach utilizes the graph of page nodes and objects (the DCG) to determine what should be pulled down to the edge cache proactively. As explained, the approach is chunk-based, and it provides significant advantages, especially with respect to no-store (or "0" TTL) content that requires an origin request to serve. The approach may also be used for cacheable content.

In summary, the prediction techniques described above provide for a method to predict future occurrences of data based upon repeated patterns of access in prior-seen data, and then using the prediction results to pre-warm the cache nearest the consumer to reduce round trips and latency.

Summarizing, the deduplication approach described herein enables removal of redundant data being sent between peers on the network, instead sending much smaller fingerprints. This reduces the overall size of the data on the wire drastically for transactions that have high amounts of duplicate data, thus reducing the amount of time for delivery to the end user. In addition, the reduced data results in lowered operating costs on the network as the amount of information transferred and the bandwidth requires decreases.

A deduplication system as described herein is capable of removing redundant data patterns between peers in order to provide significant compression savings. The architecture approach shown in FIG. 6 may be used, but this is not a requirement, as the dedupe functionality may be implemented in any manner depending on the associated peer implementation. More generally, the dedupe functionality is implemented as co-processes on peer nodes. As noted, for a given request, a dedupe process near an origin replaces well-defined sections of the actual response data with references to it, while the dedupe process near the requester reverses the process, restoring the actual data for the references found. In this way, the amount of common data repeatedly transmitted between the nodes is reduced.

As used herein, a "fingerprint" is a binary compressed representation of a string of data, such as a file. Typically, a fingerprint is a hash with good cryptographic properties, such as SHA-1.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server.

What is claimed is as follows:

1. A method operative in an overlay network comprising a sending peer and a receiving peer, comprising:
   maintaining a directed cyclic graph in association with the sending peer;
   maintaining a directed cyclic graph in association with the receiving peer;
   wherein each directed cyclic graph comprises a set of nodes and edges that collectively represent temporal and ordered relationships among blocks of data that have been seen in the data stream by the respective peer, wherein each node represents a chunk of data, and an edge between nodes represents a transition that the respective peer has seen in the data stream with respect to that chunk, the directed cyclic graph being annotated with information from which the respective peer can generate a prediction about blocks of data that are subject to a stream-based data deduplication;
   the receiving peer generating a hinting request that predicts what blocks of data the sending peer is expected to utilize during stream-based data deduplication of a page;
   the sending peer generating a hinting response that predicts what blocks of data are expected to compose the page;
   wherein the hinting request and the hinting response are generated in software executing in a hardware element.

2. A method operative in an overlay network comprising a sending peer and a receiving peer, the sending peer associated with an origin, and the receiving peer associated with an overlay network edge, the method comprising:
   maintaining a directed cyclic graph in association with the sending peer;
   maintaining a directed cyclic graph in association with the receiving peer;
   wherein each directed cyclic graph comprises a set of nodes and edges that collectively represent temporal and ordered relationships among blocks of data that have been seen in the data stream by the respective peer, wherein each node represents a chunk of data, and an edge between nodes represents a transition that the respective peer has seen in the data stream with respect to that chunk, the directed cyclic graph being annotated with information from which the respective peer can generate a prediction about blocks of data that are subject to a stream-based data deduplication;
   using the annotated directed cyclic graphs to enforce a compression protocol across the sending and receiving peers;
   wherein the compression protocol is carried out in software executing in one or more hardware elements.

3. The method as described in claim 1 wherein the sending peer returns the hinting response to the receiving peer while going forward to an origin to fetch the page.

4. The method as described in claim 3 wherein the receiving peer uses information in the hinting response to pre-warm an associated cache with the blocks of data that the sending peer predicts are expected to compose the page.

5. The method as described in claim 3 wherein the sending peer ceases sending information associated with one or more hinting responses when the data from the origin begins to arrive on the sending peer.

6. The method as described in claim 1 wherein the information that annotates a directed cyclic graph identifies a URI-host and path from which one or more blocks of data originate, and a number of times that a page associated with the URI-host and path has led to given other content represented in the annotated directed cyclic graph.

7. The method as described in claim 6 wherein a hinting request generated by the receiving peer predicts the blocks of data the sending peer is expected to utilize when a value of the number reaches a configurable threshold.

8. The method as described in claim 1 wherein the hinting response also predicts what blocks of data are expected to be included in one or more objects that depend from the page.

9. The method as described in claim 8 wherein the one or more objects are one of: embedded page objects, and at least one linked page along with its associated embedded objects.

10. A method operative in an overlay network comprising a sending peer and a receiving peer, comprising:
    maintaining a directed cyclic graph in association with the sending peer;
    maintaining a directed cyclic graph in association with the receiving peer;
    wherein each directed cyclic graph represents temporal and ordered relationships among blocks of data that have been seen in the data stream by the respective peer, the directed cyclic graph being annotated with information from which the respective peer can generate a prediction about blocks of data that are subject to a stream-based data deduplication;
    the receiving peer generating a hinting request that predicts what blocks of data the sending peer is expected to utilize during stream-based data deduplication of a page;
    the sending peer generating a hinting response that predicts what blocks of data are expected to compose the page;
    wherein the sending peer returns the hinting response to the receiving peer while going forward to an origin to fetch the page;
    wherein the hinting request and the hinting response are generated in software executing in a hardware element.

11. The method as described in claim 10 wherein the sending peer ceases sending information associated with one or more hinting responses when the data from the origin begins to arrive on the sending peer.

12. A method operative in an overlay network comprising a sending peer and a receiving peer, comprising:
    maintaining a directed cyclic graph in association with the sending peer;
    maintaining a directed cyclic graph in association with the receiving peer;
    wherein each directed cyclic graph represents temporal and ordered relationships among blocks of data that have been seen in the data stream by the respective peer, the directed cyclic graph being annotated with information from which the respective peer can generate a prediction about blocks of data that are subject to a stream-based data deduplication, wherein the information identifies a URI-host and path from which one or more blocks of data originate, and a number of times that a page associated with the URI-host and path has led to given other content represented in the annotated directed cyclic graph;
    the receiving peer generating a hinting request that predicts what blocks of data the sending peer is expected to utilize during stream-based data deduplication of a page;

the sending peer generating a hinting response that predicts what blocks of data are expected to compose the page;
wherein the hinting request and the hinting response are generated in software executing in a hardware element.

13. The method as described in claim 12 wherein a hinting request generated by the receiving peer predicts the blocks of data the sending peer is expected to utilize when a value of the number reaches a configurable threshold.

14. A method operative in an overlay network comprising a sending peer and a receiving peer, comprising:
maintaining a directed cyclic graph in association with the sending peer;
maintaining a directed cyclic graph in association with the receiving peer;
wherein each directed cyclic graph represents temporal and ordered relationships among blocks of data that have been seen in the data stream by the respective peer, the directed cyclic graph being annotated with information from which the respective peer can generate a prediction about blocks of data that are subject to a stream-based data deduplication;
the receiving peer generating a hinting request that predicts what blocks of data the sending peer is expected to utilize during stream-based data deduplication of a page;
the sending peer generating a hinting response that predicts what blocks of data are expected to compose the page, wherein the hinting response also predicts what blocks of data are expected to be included in one or more objects that depend from the page;
wherein the hinting request and the hinting response are generated in software executing in a hardware element.

15. The method as described in claim 14 wherein the one or more objects are one of: embedded page objects, and at least one linked page along with its associated embedded objects.

* * * * *